US009976847B2

(12) United States Patent
Shin et al.

(10) Patent No.: US 9,976,847 B2
(45) Date of Patent: May 22, 2018

(54) POLARIZATION INDEPENDENT OPTICAL SHUTTER USING CHOLESTERIC LIQUID CRYSTALS AND THREE-DIMENSIONAL IMAGE ACQUISITION APPARATUS EMPLOYING THE SAME

(71) Applicant: Samsung Electronics Co., Ltd., Suwon-si, Gyeonggi-do (KR)

(72) Inventors: Jung-soon Shin, Yongin-si (KR); Jae-hyuk Choi, Seoul (KR); Jeroen Beeckman, Ghent (BE); Mohammad Mohammadimasoudi, Ghent (BE); Kristiaan Neyts, Ghent (BE)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 323 days.

(21) Appl. No.: 14/687,445

(22) Filed: Apr. 15, 2015

(65) Prior Publication Data
US 2015/0304637 A1 Oct. 22, 2015

(30) Foreign Application Priority Data

Apr. 16, 2014 (KR) .................. 10-2014-0045496

(51) Int. Cl.
*G02F 1/1347* (2006.01)
*G01B 11/24* (2006.01)
*G02F 1/1334* (2006.01)

(52) U.S. Cl.
CPC ............ *G01B 11/24* (2013.01); *G02F 1/1347* (2013.01); *G02F 1/13473* (2013.01);
(Continued)

(58) Field of Classification Search
CPC ......... H04N 13/00; G02F 1/00; G02F 1/1347; G02F 1/1334; G02F 2001/13478; G02F 2203/06; G01B 11/24
See application file for complete search history.

(56) References Cited

U.S. PATENT DOCUMENTS

2007/0152928 A1* 7/2007 Doane ............... G02F 1/133305
  345/87
2015/0015818 A1   1/2015 Kim et al.
2015/0153595 A1* 6/2015 Li .......................... G02F 1/0045
  349/62

FOREIGN PATENT DOCUMENTS

EP       0803525 A2 * 10/1997 ............. C08G 59/18
KR    2005-0024347 A    3/2005
(Continued)

OTHER PUBLICATIONS

J.L. De Bougrenet De La Tocnaye, "Engineering liquid crystals for optimal uses in optical communication systems", Liquid Crystals, vol. 31, No. 2, Feb. 2004, pp. 241-269.
(Continued)

*Primary Examiner* — Nathanael R Briggs
(74) *Attorney, Agent, or Firm* — Harness, Dickey & Pierce, P.L.C.

(57) ABSTRACT

Example embodiments relate to an optical shutter including a first polarization filter having a nanopore-cholesteric liquid crystal layer, which includes a cholesteric liquid crystal matrix and a plurality of liquid crystal nanopores embedded in the cholesteric liquid crystal matrix, and having a reflective wavelength band that varies according to electrical control, and a second polarization filter that is parallel to the first polarization filter, includes a nanopore-cholesteric liquid crystal layer, which includes a cholesteric liquid crystal matrix and a plurality of liquid crystal nanopores embedded in the cholesteric liquid crystal matrix, and has a reflective wavelength band that varies according to electrical control.

16 Claims, 6 Drawing Sheets

(52) U.S. Cl.
CPC .. *G02F 1/1334* (2013.01); *G02F 2001/13478* (2013.01); *G02F 2203/06* (2013.01)

(56) References Cited

FOREIGN PATENT DOCUMENTS

| KR | 10-1291923 B1 | 7/2013 |
|---|---|---|
| WO | WO-9723580 A1 | 7/1997 |
| WO | WO-2009087583 A1 | 7/2009 |

OTHER PUBLICATIONS

E. Kallos et al., "Enhanced Absorption via Light Trapping using Cholesteric Liquid Crystals", Department of Materials Science, University of Patras, Panepistimioupolis, Rio, Greece, pp. 2.

Joroen Beeckman et al., "Liquid-crystal photonic applications", Optical Engineering 50(8), 081202 (Aug. 2011), pp. 17.

Kwang-Soo Bae, "Single pixel transmissive and reflective liquid crystal display using broadband cholesteric liquid crystal film", Apr. 25, 2011/vol. 19, No. 9, Optics Express pp. 8291-8296.

Yo Inoue et al., "Tunable Lasing from a Cholesteric Liquid Crystal Film Embedded with a Liquid Crystal Nanopore Network", Wiley-VCH Verlag GmbH & Co. KGaA, 2011, 23, pp. 5498-5501.

\* cited by examiner

POLARIZATION INDEPENDENT OPTICAL SHUTTER USING CHOLESTERIC LIQUID CRYSTALS AND THREE-DIMENSIONAL IMAGE ACQUISITION APPARATUS EMPLOYING THE SAME

RELATED APPLICATION

This application claims the benefit of priority from Korean Patent Application No. 10-2014-0045496, filed on Apr. 16, 2014, in the Korean Intellectual Property Office, the disclosure of which is incorporated herein in its entirety by reference.

BACKGROUND

1. Field

Example embodiments relate to an optical shutter having a short switching time and/or a three-dimensional (3D) image acquisition apparatus including the optical shutter.

2. Description of the Related Art

An optical shutter capable of controlling transmission of incident light is widely used in various areas such as a display or a camera.

Recently, the importance of three-dimensional (3D) content has been highlighted along with the development of 3D display devices, and an increased demand for 3D display devices, and accordingly, 3D cameras, also draws a lot of attention. A 3D camera typically measures two-dimensional (2D) red-green-blue (RGB) image information and 3D image information. A typical method of measuring the 3D image information is roughly classified into a stereo method and a depth measuring method. The stereo method measures a left-eye image and a right-eye image and depths of the left-eye image and the right-eye image are processed by the brain of a person. The depth measuring method is directly measuring 3D distance information by using, for example, triangulation or time-of-flight (TOF).

A typical structure for measuring the 3D image information by using the depth measuring method may be a two-lens-two-sensor structure, a one-lens-two-sensor structure, or a one-lens-one-sensor structure. The one-lens-one-sensor structure using one lens and one sensor has advantages in volume and price compared to other structures. In this case, since an image sensor needs to receive visible light and infrared rays by time multiplexing, an optical shutter capable of quickly turning on/off light in a desired wavelength band.

SUMMARY

Example embodiments relate to an optical shutter having a short switching time and a three-dimensional (3D) image acquisition apparatus including the same.

Additional example embodiments will be set forth in part in the description which follows and, in part, will be apparent from the description, or may be learned by practice of the example embodiments.

According to at least one example embodiment, an optical shutter includes a first polarization filter including a nanopore-cholesteric liquid crystal layer, which includes a cholesteric liquid crystal matrix and a plurality of liquid crystal nanopores embedded in the cholesteric liquid crystal matrix, and having a reflective wavelength band that varies according to electrical control, and a second polarization filter that is parallel to the first polarization filter, includes a nanopore-cholesteric liquid crystal layer, which includes a cholesteric liquid crystal matrix and a plurality of liquid crystal nanopores embedded in the cholesteric liquid crystal matrix, and has a reflective wavelength band that varies according to electrical control.

In the first and second polarization filters, liquid crystals in the plurality of liquid crystal nanopores may be rearranged when an electric field is formed in the nanopore-cholesteric liquid crystal layer, and thus, effective refractive index of the nanopore-cholesteric liquid crystal layer and the reflective wavelength bands may be changed.

The plurality of liquid crystal nanopores may include a plurality of non-reactive liquid crystals (LC).

A diameter of each of the plurality of liquid crystal nanopores may be smaller than or equal to about 100 nm.

The nanopore-cholesteric liquid crystal layer of the first polarization filter and the nanopore-cholesteric liquid crystal layer of the second polarization filters may be configured to have the same reflective wavelength bands with regard to lights of circular polarization that are opposite to each other.

The nanopore-cholesteric liquid crystal layer of the first polarization filter and the nanopore-cholesteric liquid crystal layer of the second polarization filters may be configured to have the same reflective wavelength bands with regard to lights of circular polarization that are in the same direction, and a half-wave plate may be further arranged between the first and second polarization filters.

The first and second polarization filters may respectively have fixed spiral directions of the cholesteric liquid crystal matrix in order to reflect right-handed circular polarization.

The nanopore-cholesteric liquid crystal layers of the first and second polarization filters may be configured to turn on or off light in a wavelength band from about 650 nm to about 2500 nm according to control of a voltage applied to the first and second polarization filters.

According to another example embodiment, a three-dimensional (3D) image acquisition apparatus includes a lighting unit for irradiating light in an infrared band to an object in order to obtain depth information about the object, an image-forming lens unit for forming an image of the object, the optical shutter being formed to turn on or off the light in the infrared band irradiated by the lighting unit, a visible light shutter for turning on or off light in a visible light band, a control unit for controlling the optical shutter and the visible light shutter to alternately turn on or off the light by time multiplexing, an image sensor for sensing the light reflected from the object and passing through the image-forming lens unit, and a 3D image processor for obtaining color image information and depth image information by using the light sensed by the image sensor and generating 3D image information.

The 3D image acquisition apparatus may further include a broadband filter for transmitting light in the infrared band and light in the visible light band.

The broadband filter may be arranged between the object and the image-forming lens unit.

The broadband filter may be formed on a lens surface of the image-forming lens unit at an object side.

The lighting unit may irradiate light in a wavelength band from about 650 nm to about 2500 nm.

The nanopore-cholesteric liquid crystal layer of the first polarization filter and the nanopore-cholesteric liquid crystal layer of the second polarization filters may be configured to have the same reflective wavelength bands with regard to lights of circular polarization that are opposite to each other.

The nanopore-cholesteric liquid crystal layer of the first polarization filter and the nanopore-cholesteric liquid crystal layer of the second polarization filters may be configured to have the same reflective wavelength bands with regard to lights of circular polarization that are in the same direction, and a half-wave plate may be further arranged between the first and second polarization filters.

BRIEF DESCRIPTION OF THE DRAWINGS

These and/or other example embodiments will become apparent and more readily appreciated from the following description, taken in conjunction with the accompanying drawings in which.

DETAILED DESCRIPTION

Figure 1A:
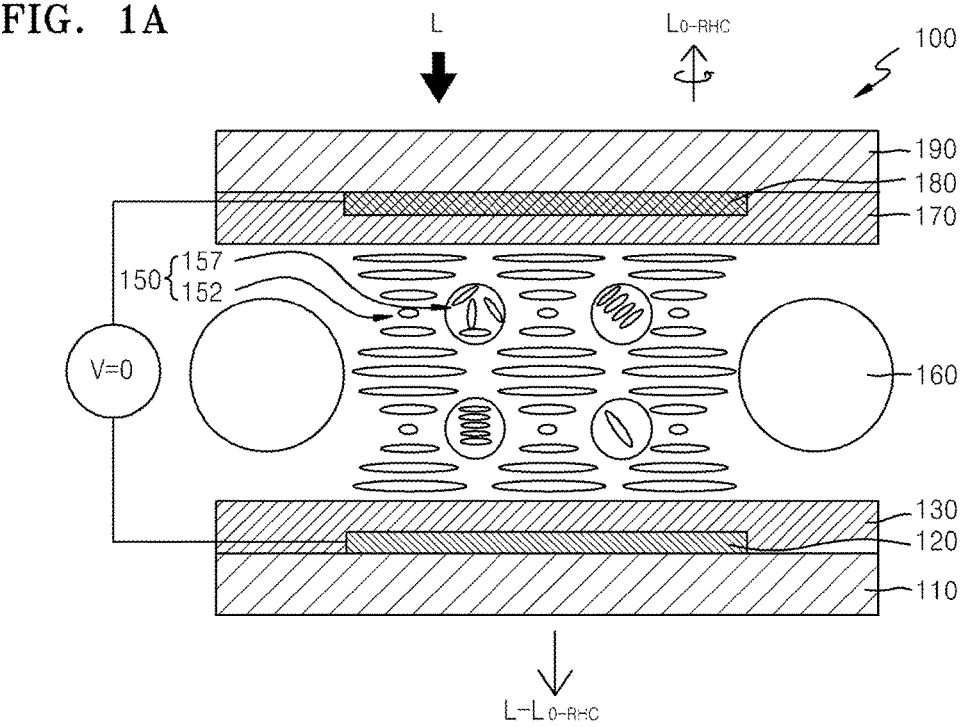
FIGS. 1A and 1B show a schematic structure of a polarization filter of an optical shutter in operation in a voltage non-application state and in a voltage application state, according to an example embodiment.

An optical shutter and a three-dimensional (3D) image acquisition apparatus including the same will now be described fully with reference to the accompanying drawings, wherein like reference numerals refer to like elements throughout. Sizes of components in the drawings may be exaggerated for convenience and clarity of explanation. The present embodiments may have different forms and should not be construed as being limited to the descriptions set forth herein.

It will be understood that when an element is referred to as being "on," "connected" or "coupled" to another element, it can be directly on, connected or coupled to the other element or intervening elements may be present. In contrast, when an element is referred to as being "directly on," "directly connected" or "directly coupled" to another element, there are no intervening elements present. As used herein the term "and/or" includes any and all combinations of one or more of the associated listed items. Further, it will be understood that when a layer is referred to as being "under" another layer, it can be directly under or one or more intervening layers may also be present. In addition, it will also be understood that when a layer is referred to as being "between" two layers, it can be the only layer between the two layers, or one or more intervening layers may also be present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

In the drawing figures, the dimensions of layers and regions may be exaggerated for clarity of illustration. Like reference numerals refer to like elements throughout. The same reference numbers indicate the same components throughout the specification.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein. As used herein, expressions such as "at least one of," when preceding a list of elements, modify the entire list of elements and do not modify the individual elements of the list.

Figure 1B:
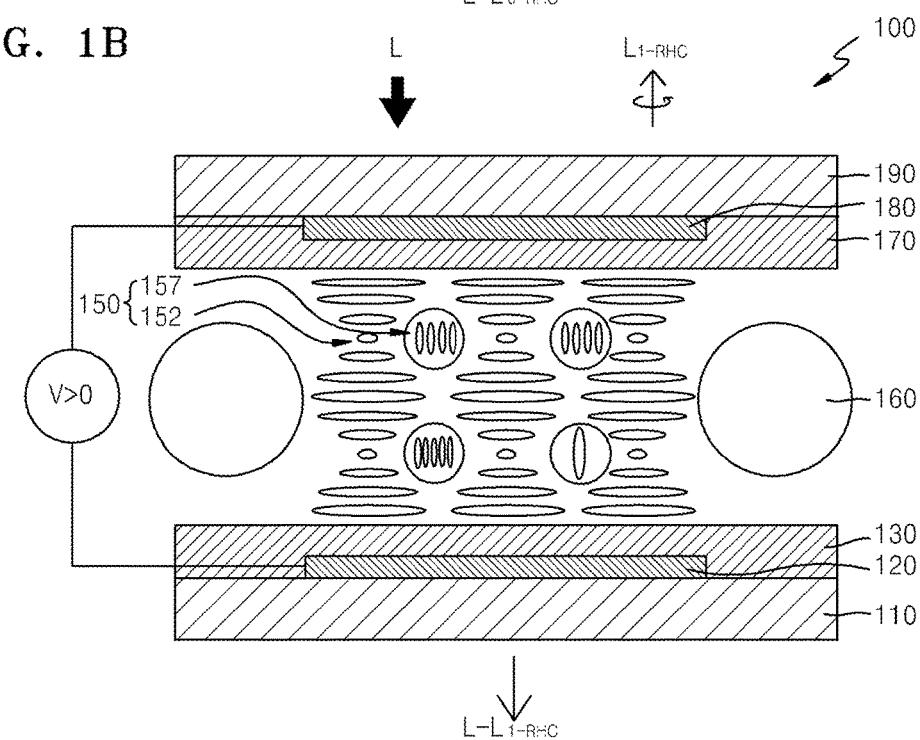

FIGS. 1A and 1B are schematic structures of a polarization filter 100 of an optical shutter in operation in a voltage non-application state and in a voltage application state, according to at least one example embodiment.

The polarization filter 100 includes a nanopore-cholesteric liquid crystal layer 150. The nanopore-cholesteric liquid crystal layer 150 has a structure in which multiple liquid crystal nanopores 157 are embedded in a cholesteric liquid crystal matrix 152.

The cholesteric liquid crystal matrix 152 may include polymerized cholesteric liquid crystals. The liquid crystal nanopores 157 may have a structure in which non-reactive liquid crystals are located in a nano-sized droplet. A diameter of each of the liquid crystal nanopores 157 may be smaller than or equal to about 100 nm.

The cholesteric liquid crystal matrix 152 may be formed of or include combinations of reactive liquid crystal (LC) mesogen and non-reactive LC mesogen.

In general, the cholesteric liquid crystals are liquid crystal composites in which nematic liquid crystals are spirally arranged, and polarization of reflective light and a reflective wavelength band ($\Delta\lambda$) are determined according to a pitch p and a rotational direction of the cholesteric liquid crystals. The pitch p of a cholesteric liquid crystal is defined as a distance at which liquid crystal directors rotate by 360 degrees. The rotational direction may be a left-handed circular direction or a right-handed circular direction. The reflective wavelength band ($\Delta\lambda$) is defined as follows:

$$\Delta\lambda = (\Delta n)p$$

$\Delta n$ is a difference of the refractive index which results from the anisotropy of the liquid crystals. The liquid crystals have a different permittivity according to axes, that is, the permittivity of a major axis and the permittivity of a minor axis are different. Accordingly, a refractive index with respect to light of polarization of the major axis is different from a refractive index with respect to light of polarization of the minor axis. That is, $\Delta n$ is a difference between an extraordinary refractive index and an ordinary refractive index.

As described above, when the nanopore-cholesteric liquid crystal layer 150 is formed by dispersing the liquid crystal nanopores 157 into the cholesteric liquid crystal matrix 152, the reflective wavelength band of the nanopore-cholesteric liquid crystal layer 150 is determined based on the pitch p of the cholesteric liquid crystal matrix 152 and an effective refractive index of the nanopore-cholesteric liquid crystal layer 150.

When an electric field is formed within the nanopore-cholesteric liquid crystal layer 150, the pitch p of the polymerized cholesteric liquid crystal matrix 152 does not substantially change, but the liquid crystals included in the liquid crystal nanopores 157 are re-arranged along a direction of the electric field. Thus, a range of the effective refractive index is changed due to the rearrangement, and the reflective wavelength band may be shifted.

The polarization filter 100 has a structure in which the nanopore-cholesteric liquid crystal layer 150 is between a first substrate 110, on which a first electrode 120 and a first alignment layer 130 are located, and a second substrate 190 on which a second electrode 180 and a second alignment layer 170 are located.

The first substrate 110 and the second substrate 190 may be formed of or include glass or transparent plastic materials, and the first electrode 120 and the second electrode 180 may be formed of or include transparent conductive materials such as, for example, indium tin oxide (ITO). Spacer beads 160 may be between the first substrate 110 and the second substrate 190, but other types of spacers or sidewalls may also be present.

In FIG. 1A, the electric field is not formed in the nanopore-cholesteric liquid crystal layer 150 because a voltage is not applied between the first electrode 120 and the second electrode 180, according to at least one example embodiment. In this case, the liquid crystals of the liquid crystal nanopores 157 are substantially randomly arranged. Alternately, the liquid crystals of the liquid crystal nanopores 157 have a similar or a same shape to the cholesteric liquid crystal matrix 152, which is twisted on a plane, and the arrangement of the liquid crystals is not exactly the same as the arrangement of the cholesteric liquid crystal matrix 152. The nanopore-cholesteric liquid crystal layer 150 has an effective refractive index determined by the liquid crystal nanopores 157 and the cholesteric liquid crystal matrix 152, and the reflective wavelength band is determined based on the effective refractive index and a spiral pitch of the cholesteric liquid crystal matrix 152. If the reflective wavelength band is $(\Delta\lambda)_0$, the light $L-L_{0-RHC}$ which is within the reflective wavelength band $(\Delta\lambda)_0$ and has right-handed circular polarization of the reflective wavelength band $(\Delta\lambda)_0$ from among the incident light L is reflected, and the remaining light ($L-L_{0-RHC}$) passes through the nanopore-cholesteric liquid crystal layer 150. It is assumed that a spiral rotation direction of the cholesteric liquid crystal matrix 152 is a right-handed direction.

In FIG. 1B, an electric field is formed in the nanopore-cholesteric liquid crystal layer 150 because a voltage is applied between the first electrode 120 and the second electrode 180, according to at least one example embodiment. In this case, the liquid crystals of the liquid crystal nanopores 157 are re-arranged along a direction of the electric field. Accordingly, the effective refractive index of the nanopore-cholesteric liquid crystal layer 150 is changed. For example, the effective refractive index of the nanopore-cholesteric liquid crystal layer 150 is decreased, and the reflective wavelength band becomes $(\Delta\lambda)_1$. Light $L_{1-RHC}$, which is within the reflective wavelength band $(\Delta\lambda)_1$ and has right-handed circular polarization from among the incident light L, is reflected, and the remaining light $L-L_{1-RHC}$ passes through the nanopore-cholesteric liquid crystal layer 150.

In consideration of the aforementioned operations of the polarization filter 100, ranges of the $(\Delta\lambda)_0$ and $(\Delta\lambda)_1$ may be properly determined to generate light, which is in a desired wavelength band from among the circular polarization rotating in a direction that is the same as the spiral rotation direction of the cholesteric liquid crystal matrix 152, to pass or not to pass through the polarization filter 100.

The above-described reflective wavelength band may change relatively rapidly. When the reflective wavelength band varies by changing the spiral pitch of the cholesteric liquid crystals, it typically takes about an order of seconds to correspondingly move the reflective wavelength band.

On the contrary, when the reflective wavelength band varies by rearranging the liquid crystals in the liquid crystal nanopores 157 embedded in the cholesteric liquid crystal matrix 152 without changing the spiral pitch of the cholesteric liquid crystal matrix 152, it may take about an order of milliseconds to correspondingly move the reflective wavelength band.

The nanopore-cholesteric liquid crystal layer 150 may be formed of or include liquid crystal materials that are commercially available. For example, a desired reflective wavelength band may be generated by properly combining a photopolymerizable cholesteric liquid crystal mixture, a nematic liquid crystal mixture, and a chiral dopant. The spiral pitch is determined according to the amount of the chiral dopant, and the spiral rotation direction is determined according to types of the chiral dopant. It is believed that a spiral rotation direction of most chiral dopants is fixed in a right-handed circular direction.

Figure 2A:
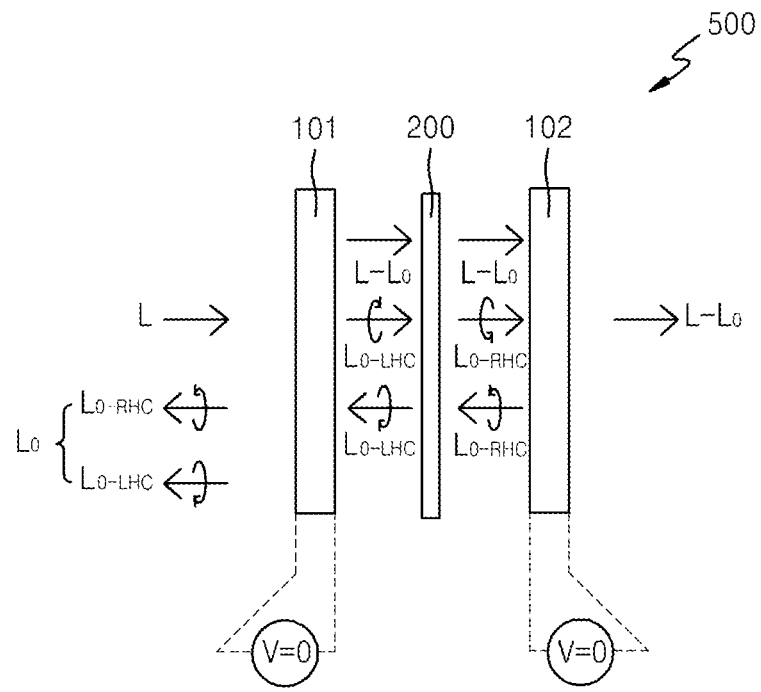
FIGS. 2A and 2B show a schematic structure of an optical shutter and respectively show an optical path of incident light in a voltage non-application state and in a voltage application state, according to an example embodiment.
Figure 2B:
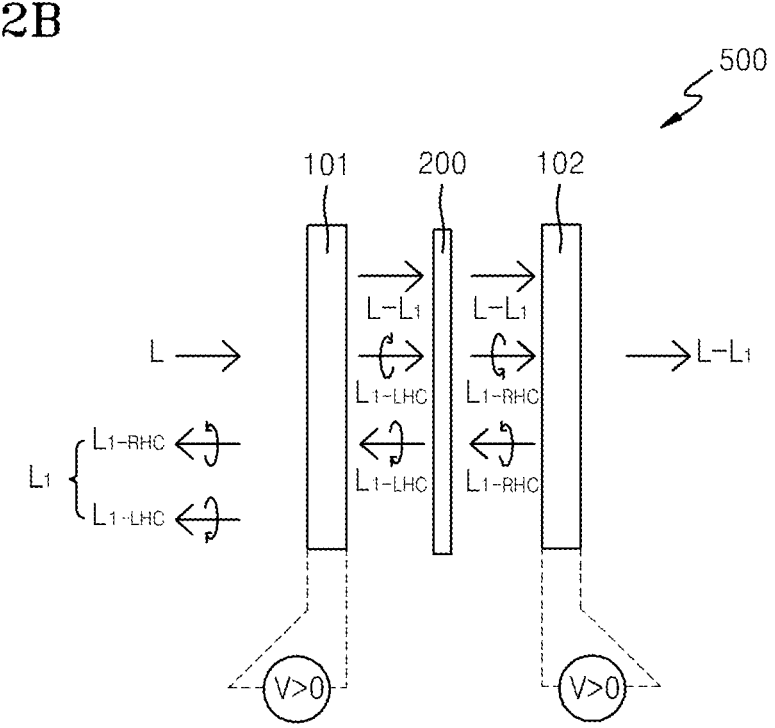

FIGS. 2A and 2B are a schematic structure of an optical shutter 500 and respectively show an optical path of incident light in a voltage non-application state and in a voltage application state, according to an example embodiment.

The optical shutter 500 has a structure in which a half-wave plate 200 is arranged between a first polarization filter 101 and a second polarization filter 102. The first polarization filter 101 and the second polarization filter 102 may have the same structure as the polarization filter 100. That is, in the first polarization filter 101 and the second polarization filter 102, nanopore-cholesteric liquid crystal layers may be configured to reflect light which is in the wavelength band $(\Delta\lambda)_0$ and has right-handed circular polarization, when the voltage is not applied.

In comparison with the polarization filter 100 of FIGS. 1A and 1B that turns on or off the light in a desired, or alternatively predetermined wavelength band of desired, or alternatively predetermined circular polarization according to the spiral rotation direction of the cholesteric liquid crystals, the optical shutter 500 may turn on or off the light in the desired, or alternatively predetermined wavelength band of the incident light L, independent of its polarization.

Referring to FIG. 2A, the light $L_{0\text{-}RHC}$ of the right-handed circular polarization of the wavelength band $(\Delta\lambda)_0$ from among the incident light L is reflected, and the remaining light passes through the first polarization filter 101. The light passing through the first polarization filter 101 may be classified as the light $(L_{0\text{-}LHC})$ of the left-handed circular polarization of the reflective wavelength band $(\Delta\lambda)_0$ and the light $(L\text{-}L_0)$ in another wavelength band. The light $(L_{0\text{-}LHC})$ of the left-handed circular polarization of the wavelength band $(\Delta\lambda)_0$ passes through the half-wave plate 200, and is subsequently changed into the light of the right-handed circular polarization of the wavelength band $(\Delta\lambda)_0$. Since light $(L\text{-}L_0)$ in other wavelength bands has a random polarization direction, the light $(L\text{-}L_0)$ has random polarization even though the light $(L\text{-}L_0)$ passes through the half-wave plate 200. In addition, the light $(L\text{-}L_0)$ may not include light in the reflective wavelength band $(\Delta\lambda)_0$ of the second polarization filter 102, and thus, the light $(L\text{-}L_0)$ passes through the second polarization filter 102. The light $(L_{0\text{-}RHC})$ of the right-handed circular polarization, which passes through the half-wave plate 200, is reflected by the second polarization filter 102 and is subsequently changed into the light $(L_{0\text{-}LHC})$ of the left-handed polarization by the half-wave plate 200, and thus the light $(L_{0\text{-}LHC})$ is not reflected by the first polarization filter 101 and passes through the first polarization filter 101.

As a result, the light $(L_0)$ in the reflective wavelength band $(\Delta\lambda)_0$, from among the incident light L, is reflected regardless of the types of the polarization, and the light (L-L0) in another wavelength band passes through the optical shutter 500.

FIG. 2B illustrates a state in which a desired, or alternatively predetermined voltage is applied in the first polarization filter 101 and the second polarization filter 102, and accordingly, the reflective wavelength band changes from $(\Delta\lambda)0$ to $(\Delta\lambda)1$. Therefore, through the same process as the process described with reference to FIG. 2A, the light $(L_1)$ in the wavelength band $(\Delta\lambda)_1$ from among the incident light L is reflected from the optical shutter 500 regardless of the types of the polarization, and the light in another wavelength band, $L\text{-}L_1$ passes through the optical shutter 500.

The light in a desired, or alternatively predetermined reflective wavelength band may be turned on or off according to whether a voltage is applied to the optical shutter 500 and a proper set-up of the reflective wavelength bands $(\Delta\lambda)_0$ and $(\Delta\lambda)_1$. Turning on or off of the light does not necessarily mean that the transmission of the light is 100% or 0%, and means that the transmission of the light is properly changed in accordance with the conventional function of the shutter. Hereinafter, the turning on or off the light means the same as the above. The light in a desired, or alternatively predetermined reflective wavelength band is light that is included in any one of the reflective wavelength bands $(\Delta\lambda)_0$ and $(\Delta\lambda)_1$.

Figure 3:
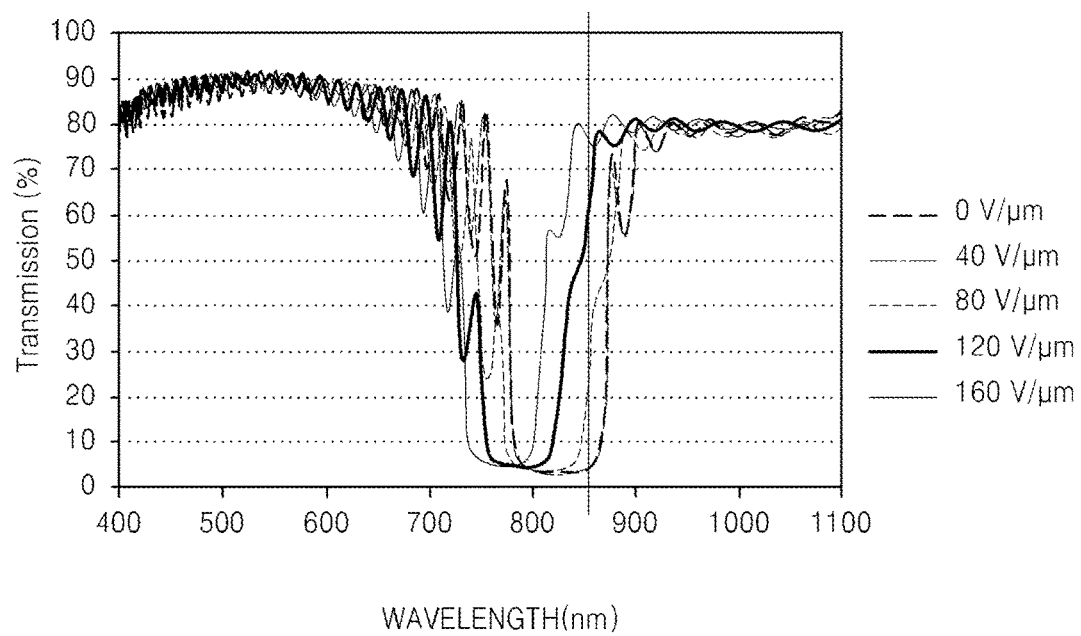
FIG. 3 is a graph of a change in a reflective wavelength band of the polarization filter of FIG. 1A according to electric fields, according to an example embodiment.

FIG. 3 is a graph for showing a change of a reflective wavelength band of the polarization filter of FIG. 1A according to electric fields.

Referring to the graph, in the case of light having a wavelength of 850 nm, the transmission of the light is smaller than or equal to about 10% when an electric field has a value of 0. When the electric field has a value of 150 V/μm, the transmission is equal to or greater than about 70%. That is, when the structure of the optical shutter 500 is formed by using the nanopore-cholesteric liquid crystal layers that are formed as discussed above, the light in the desired, or alternatively predetermined wavelength band having a central wavelength of 850 nm may be turned on or off according to the electric field.

Figure 4A:
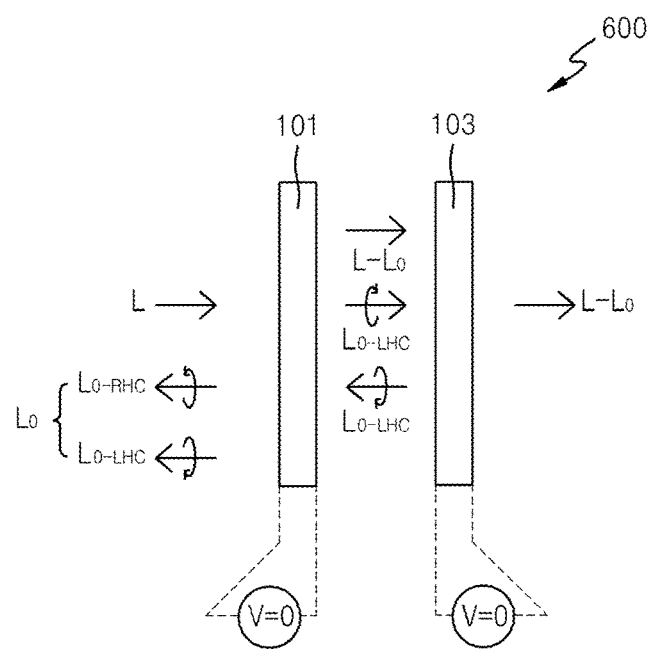
FIGS. 4A through 4B show a schematic structure of an optical shutter according to at least one example embodiment and an optical path of incident light in a voltage non-application state and in a voltage application state.
Figure 4B:
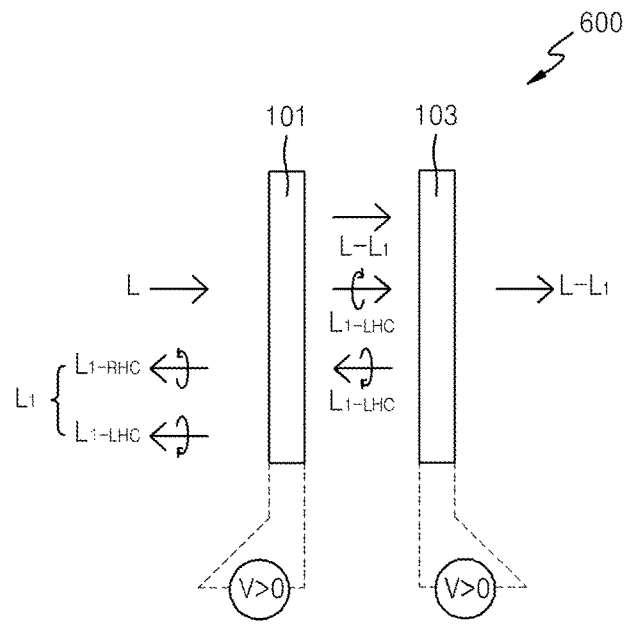

FIGS. 4A through 4B are schematic structures of an optical shutter 600 according to another example embodiment, and respectively show an optical path of the incident light L in a voltage non-application state and in a voltage application state.

The optical shutter 600 includes a first polarization filter 101 and a second polarization filter 103. Spiral rotation directions of cholesteric liquid crystals of the first polarization filter 101 and of the second polarization filter 103 are opposite to each other. That is, the first polarization filter 101 reflects the light of the right-handed circular polarization, which is in the wavelength band $(\Delta\lambda)_0$, in the voltage non-application state, and the second polarization filter 103 reflects the light of the left-handed circular polarization, which is in the wavelength band $(\Delta\lambda)_0$, in the voltage application state.

Referring to FIG. 4A, the light $(L_{0\text{-}RHC})$ of the right-handed circular polarization, which is in the wavelength band $(\Delta\lambda)_0$ from among the incident light L, is reflected by the first polarization filter 101, and the remaining light passes through the first polarization filter 101. The remaining light is classified into the light $(L_{0\text{-}LHC})$ of the left-handed circular polarization in the wavelength band $(\Delta\lambda)_0$ and the light $(L\text{-}L_0)$ in another wavelength band. The light $(L_{0\text{-}LHC})$ of the left-handed circular polarization in the wavelength band $(\Delta\lambda)_0$ is reflected by the second polarization filter 103 and passes through the first polarization filter 101. In addition, the light $(L\text{-}L_0)$ in another wavelength band passes through the second polarization filter 103. Consequently, the optical shutter 600 reflects the light $(L_0)$ in the wavelength band $(\Delta\lambda)_0$ and passes the light $(L-L_0)$ in another wavelength band regardless of directions of the polarization.

Referring to FIG. 4B, a desired, or alternatively predetermined voltage is applied to the first polarization filter 101 and to the second polarization filter 103, and the reflective wavelength band of the optical shutter 600 changes as a result. That is, the light in the wavelength band $(\Delta\lambda)_1$ is reflected and the light in another wavelength band is passed.

According to at least one example embodiment, the structure of the optical shutter 600 is simpler than the structure of the optical shutter 500. However, as described above with reference to FIGS. 1A and 1B, the spiral rotation direction of most of the chiral dopants is fixed in a right-handed circular direction, and thus, selection of the optical shutters 500 or 600 may be determined according to a given situation.

The optical shutters 500 and 600 include a cholesteric liquid crystal matrix in which liquid crystal nanopores are dispersed, and the reflective wavelength bands thereof are adjusted while liquid crystals arranged in nano-sized droplets are rearranged by the electric field.

The optical shutters 500 and 600 passes or reflects light in a desired wavelength band without any dependence on the polarization, and in this case, the optical shutters 500 and 600 may have a fast switching speed.

The optical shutters 500 and 600 may quickly turn on or off the light in the desired wavelength band and may be employed in a 3D image acquisition apparatus, such as the apparatus 1000 described below, for forming 3D images by processing color image information and depth image information by time multiplexing.

Figure 5A:
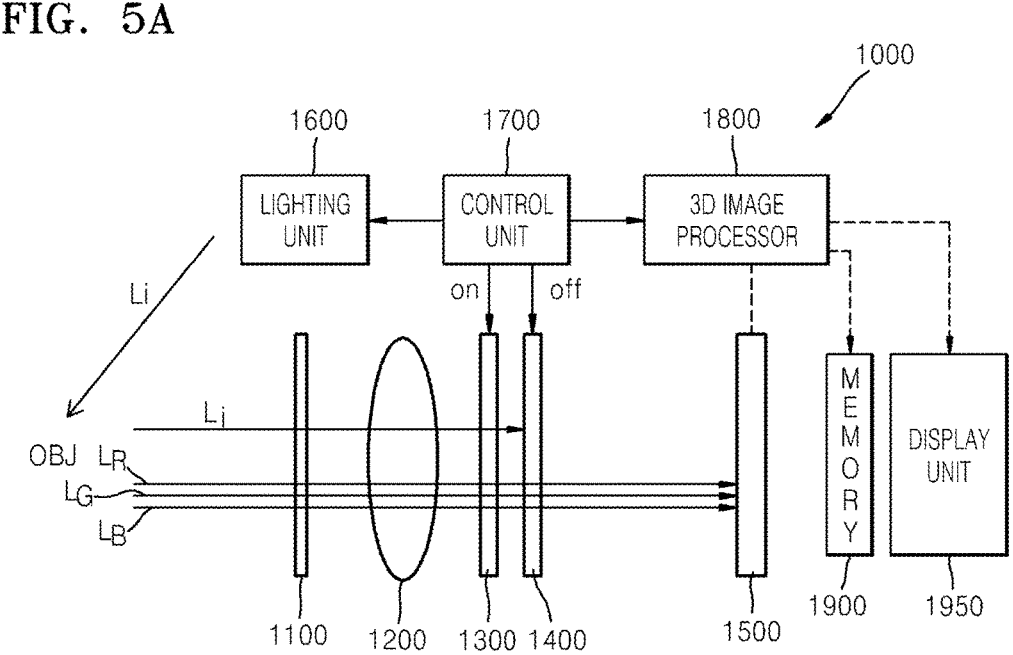
FIGS. 5A and 5B are block diagrams of a schematic structure of a three-dimensional (3D) image acquisition apparatus according to at least one example embodiment and show an optical path in a color sensing mode and in an infrared sensing mode.
Figure 5B:
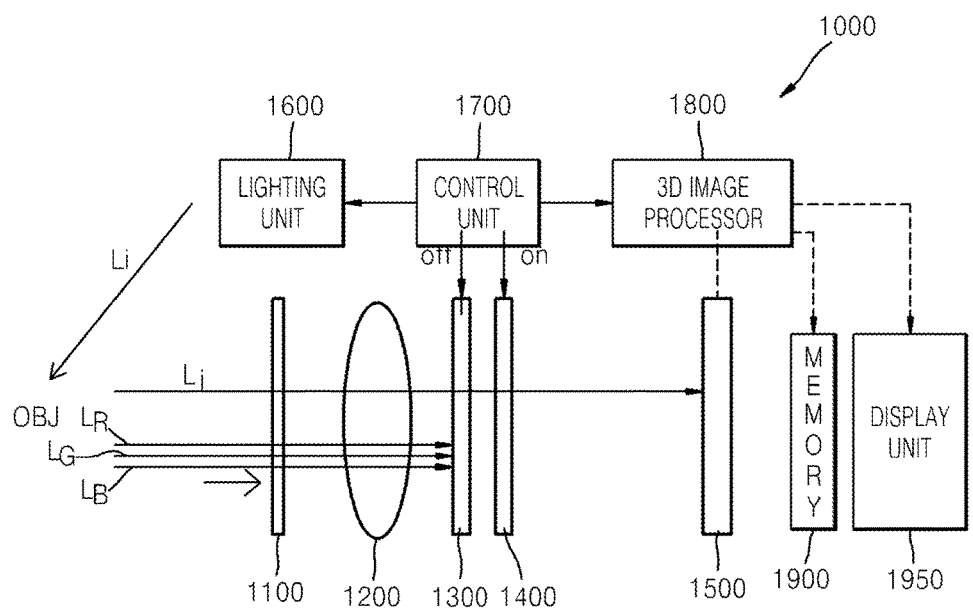

FIGS. 5A and 5B are schematic structural block diagrams of a 3D image acquisition apparatus 1000 according to an example embodiment, and respectively illustrate an optical path in a color sensing mode and in an infrared sensing mode. Also, FIGS. 6A and 6B respectively illustrate transmission patterns in the color sensing mode and in the infrared sensing mode with respect to a broadband filter 1100, a visible light shutter 1300, and an infrared shutter 1400 included in the 3D image acquisition apparatus 1000.

According to at least one example embodiment, the 3D image acquisition apparatus 1000 includes a lighting unit 1600 configured to irradiate light in an infrared band necessary to obtain depth information with regard to an object OBJ, an image forming lens unit 1200 configured to form an image of the object OBJ, the visible light shutter 1300 configured to turn on or off light in a visible light range, the infrared shutter 1400 configured to turn on or off the light in the infrared range, which is irradiated by the lighting unit 1600, an image sensor 1500 configured to sense the light reflected from the object OBJ and passing through the image forming lens unit 1200; and a 3D image processor 1800 configured to obtain the color image information and the depth image information and to generate 3D image information by using the light sensed by the image sensor 1500.

In addition, the 3D image acquisition apparatus 1000 may include a control unit 1700, a display unit 1950, and a memory 1900.

According to at least one example embodiment, the control unit 1700 is configured to control the visible light shutter 1300 to alternately turn on or off the light by the time multiplexing. In addition, the control unit 1700 is configured to control operations of the lighting unit 1600 and the 3D image processor 1800. The memory 1900 is configured to store 3D image data formed by the 3D image processor 1800, and the display unit 1950 is configured to display the image formed by the 3D image processor 1800.

Also, the 3D image acquisition apparatus 1000 may further include the broadband filter 1100. The broadband filter 1100 may be formed of or include filters configured to pass light in the visible light band and the infrared band. As illustrated in FIGS. 5A and 5B, the broadband filter 1100 may be between the object OBJ and the image forming lens unit 1200 or may be on cover glass that is usually included in a camera. Alternately, the broadband filter 1100 may be on a lens close to the object OBJ.

The lighting unit 1600 may include light sources generating and emitting the light in the infrared range, for example, laser diode (LDs), light-emitting diode (LEDs), super luminescent diodes (SLDs), etc. The light sources may be in the infrared band and may be configured to emit light in a wavelength band from about 650 nm to about 2500 nm. For example, the light sources may emit light in a band from about 825 nm to about 875 nm. In addition, the lighting unit 1600 may be configured to irradiate light, which is modulated to have a certain frequency, to the object OBJ and may further include an optical member for adjusting an optical path or band of the irradiated light.

The image forming lens unit 1200 forms an image of the object OBJ on the image sensor 1500 and is shown as a convex lens in FIGS. 5A and 5B, but is not limited thereto. The image forming lens unit 1200 may include a number of lenses having different forms and shapes prepared in consideration of functions such as an image-forming function, chromatic correction, a zooming function, etc.

The optical shutters 500 and 600 previously described may be used as the infrared shutter 1400. In this case, nanopore-cholesteric liquid crystal layers of the infrared shutter 1400 are configured to switch the light in a certain range, which is irradiated by the lighting unit 1600, for example, the light in the band from about 825 nm to about 875 nm.

In FIGS. 5A and 5B, the infrared shutter 1400 is arranged next to the visible light shutter 1300, but an order of the arrangement may be changed. In addition, the image-forming lens unit 1200 is shown to be arranged in front of the visible light shutter 1300 and the infrared shutter 1400, but the locations of the image-forming lens unit 1200, the visible light shutter 1300 and the infrared shutter 1400 may be changed.

Figure 6A:
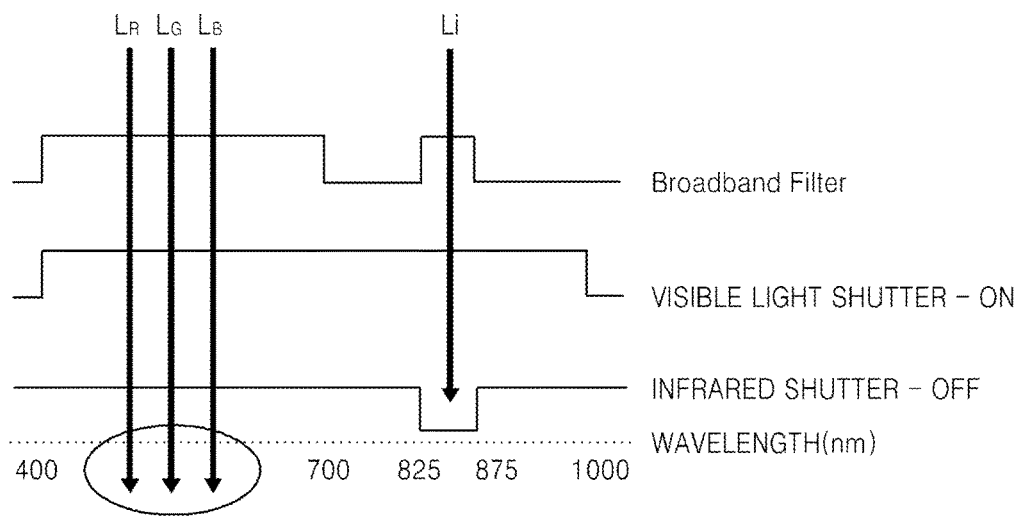
FIGS. 6A and 6B respectively illustrate transmission patterns in a color sensing mode and in an infrared sensing mode with regard to a broadband filter, a visible light shutter, and an infrared shutter included in a 3D image acquisition apparatus.

FIGS. 5A and 6A illustrate the color sensing mode, according to at least one example embodiment. The visible light shutter 1300 is turned on, and the infrared shutter 1400 is turned off. Therefore, visible lights $L_R$, $L_G$ and $L_B$ having the color image information about the object OBJ are received by the image sensor 1500.

Figure 6B:
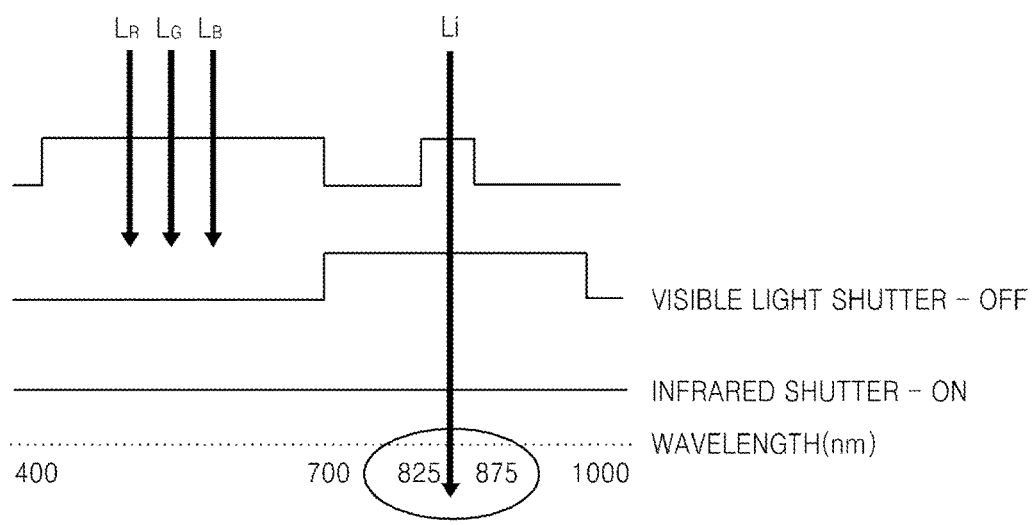

FIGS. 5B and 6B are the infrared sensing mode. The visible light shutter 1300 is turned off, and the infrared shutter 1400 is turned on. Therefore, infrared light $L_i$ having the depth image information about the object OBJ is only received by the image sensor 1500.

The 3D image processor 1800 is configured to compute the depth image information about the object OBJ by using the infrared light $L_i$ sensed by the image sensor 1500 and the color image information about the object OBJ by using the visible lights $L_R$, $L_G$ and $L_B$ sensed by the image sensor 1500. Moreover, a 3D image may be generated by combining the color image information and the depth image information.

A computation method of obtaining the depth image information about the object OBJ may include triangulation or time-of-flight (TOF). In the case of the triangulation, as a distance of the object OBJ becomes far from the 3D image acquisition apparatus 1000, accuracy of distance information degrades rapidly. Thus, accurate distance information may not be easily obtained. The TOF is used to obtain an accurate distance information and measures a flight time of light from a point in time when the light is irradiated to the object OBJ and to a point in time when the light reflected from the object OBJ is received by a light receiving unit. According to the TOF, light in a certain wavelength (for example, near-infrared ray of 850 nm) is irradiated to the object OBJ by using the LED or the LD, and a particular process for obtaining the distance information is performed after the image sensor 1500 receives the irradiated light reflected from the object.

The TOF may vary according to light processing processes, according to at least one example embodiment. For example, a direct time measuring process computes a distance by irradiating pulse light to the object OBJ and measuring a duration when the pulse light is reflected from the object OBJ by using a timer. A correlation method may be used to irradiate pulse light to the object OBJ and to measure a distance by using the brightness of the pulse light that returns after being reflected from the object OBJ. A phase leg method irradiates light having continuous waves such as sine waves to the object OBJ and converts a phase difference of the light, which is reflected from the object OBJ, into a distance.

The 3D image processor 1800, for example, computes the depth image information about the object OBJ according to any one of the above-described methods and generates a 3D image by combining the computed depth image information with the color image information.

The 3D image acquisition apparatus 1000 has the one-lens-one-sensor structure. In other words, using the time multiplexing method, the visible lights $L_R$, $L_G$ and $L_B$ having the color image information about the object OBJ and the infrared light $L_i$ having the depth image information about the object OBJ are received by the image sensor 1500 through the same optical paths. Therefore, a structure used to separate the visible lights $L_R$, $L_G$ and $L_B$ and the infrared light $L_i$, for example, beam splitter, is not necessary, and thus, an optical system becomes substantially simpler than before.

It should be understood that the example embodiments described therein should be considered in a descriptive sense only and not for purposes of limitation. Descriptions of features within each example embodiment should typically be considered as available for other similar or same features in other example embodiments.

While one or more example embodiments have been described with reference to the figures, it will be understood by those of ordinary skill in the art that various changes in form and details may be made therein without departing from the spirit and scope of the example embodiments as defined by the following claims.

What is claimed is:

1. An optical shutter comprising:
a first polarization filter including a nanopore-cholesteric liquid crystal layer, the nanopore-cholesteric liquid crystal layer including a cholesteric liquid crystal matrix and a plurality of liquid crystal nanopores embedded in the cholesteric liquid crystal matrix, the plurality of liquid crystal nanopores associated with the first polarization filter including a plurality of first non-reactive liquid crystals (LCs), and the plurality of first non-reactive LCs configured to rearrange when an electric field is applied to the nanopore-cholesteric liquid crystal layer to vary a reflective wavelength band of the first polarization filter; and
a second polarization filter parallel to the first polarization filter and including a nanopore-cholesteric liquid crystal layer, the nanopore-cholesteric liquid crystal layer including a cholesteric liquid crystal matrix and a plurality of liquid crystal nanopores embedded in the cholesteric liquid crystal matrix, the plurality of liquid crystal nanopores associated with the second polarization filter including a plurality of first non-reactive liquid crystals (LC), and the plurality of second non-reactive LCs configured to rearrange when the electric field is applied to the nanopore-cholesteric liquid crystal layer to vary a reflective wavelength band of the second polarization filter.

2. The optical shutter of claim 1, wherein an effective refractive index of the nanopore-cholesteric liquid crystal layer and the reflective wavelength bands are changed when the electric field is applied to the nanopore-cholesteric liquid crystal layer.

3. The optical shutter of claim 1, wherein a diameter of one or more of the plurality of liquid crystal nanopores is smaller than or equal to about 100 nm.

4. The optical shutter of claim 1, wherein the nanopore-cholesteric liquid crystal layer of the first polarization filter and the nanopore-cholesteric liquid crystal layer of the second polarization filter are configured to have the same reflective wavelength band with respect to lights of opposite circular polarization.

5. The optical shutter of claim 1, wherein
the nanopore-cholesteric liquid crystal layer of the first polarization filter and the nanopore-cholesteric liquid crystal layer of the second polarization filter are configured to have the same reflective wavelength band with respect to lights of circular polarization that are in the same direction, and
wherein a half-wave plate is between the first and second polarization filters.

6. The optical shutter of claim 5, wherein at least one of the first and second polarization filters have fixed spiral directions of the cholesteric liquid crystal matrix.

7. The optical shutter of claim 1, wherein the nanopore-cholesteric liquid crystal layers of the first and second polarization filters are configured to turn on or off light in a wavelength band from about 650 nm to about 2500 nm according to control of a voltage applied to the first and second polarization filters.

8. A three-dimensional (3D) image acquisition apparatus comprising:
a lighting unit configured to irradiate light in an infrared band to an object in order to obtain depth information about the object;
an image-forming lens unit configured to form an image of the object;
the optical shutter of claim 1 configured to turn on or off the light in the infrared band irradiated by the lighting unit;
a visible light shutter configured to turn on or off light in a visible light band;
a control unit configured to control the optical shutter and the visible light shutter to alternately turn on or off the light by time multiplexing;
an image sensor configured to sense the light reflected from the object and passing through the image-forming lens unit; and
a 3D image processor configured to obtain color image information and depth image information by using the light sensed by the image sensor and generating 3D image information.

9. The 3D image acquisition apparatus of claim 8, further comprising a broadband filter configured to transmit light in the infrared band and light in the visible light band.

10. The 3D image acquisition apparatus of claim 9, wherein the broadband filter is between the object and the image-forming lens unit.

11. The 3D image acquisition apparatus of claim 10, wherein the broadband filter is on a lens surface of the image-forming lens unit at an object side.

12. The 3D image acquisition apparatus of claim 8, wherein the lighting unit is configured to irradiate light in a wavelength band from about 650 nm to about 2500 nm.

13. The 3D image acquisition apparatus of claim 8, wherein the nanopore-cholesteric liquid crystal layer of the first polarization filter and the nanopore-cholesteric liquid crystal layer of the second polarization filter are configured to have the same reflective wavelength band with respect to lights of opposite circular polarization.

14. The 3D image acquisition apparatus of claim 8, wherein
the nanopore-cholesteric liquid crystal layer of the first polarization filter and the nanopore-cholesteric liquid crystal layer of the second polarization filter are configured to have the same reflective wavelength band with respect to lights of circular polarization that are in the same direction, and
a half-wave plate is between the first and second polarization filters.

15. The optical shutter of claim 1, wherein the plurality of first non-reactive LCs is configured to rearrange when the electric field is applied to the nanopore-cholesteric liquid crystal layer to vary the reflective wavelength band of the first polarization filter without changing a first spiral pitch of the cholesteric liquid crystal matrix associated with the first polarization filter.

16. The optical shutter of claim 1, wherein the plurality of second non-reactive LCs is configured to rearrange when the electric field is applied to the nanopore-cholesteric liquid crystal layer to vary the reflective wavelength band of the second polarization filter without changing a second spiral pitch of the cholesteric liquid crystal matrix associated with the second polarization filter.

* * * * *